March 11, 1941.　　　L. A. MATSON　　　2,234,678
FILTER
Filed March 13, 1939
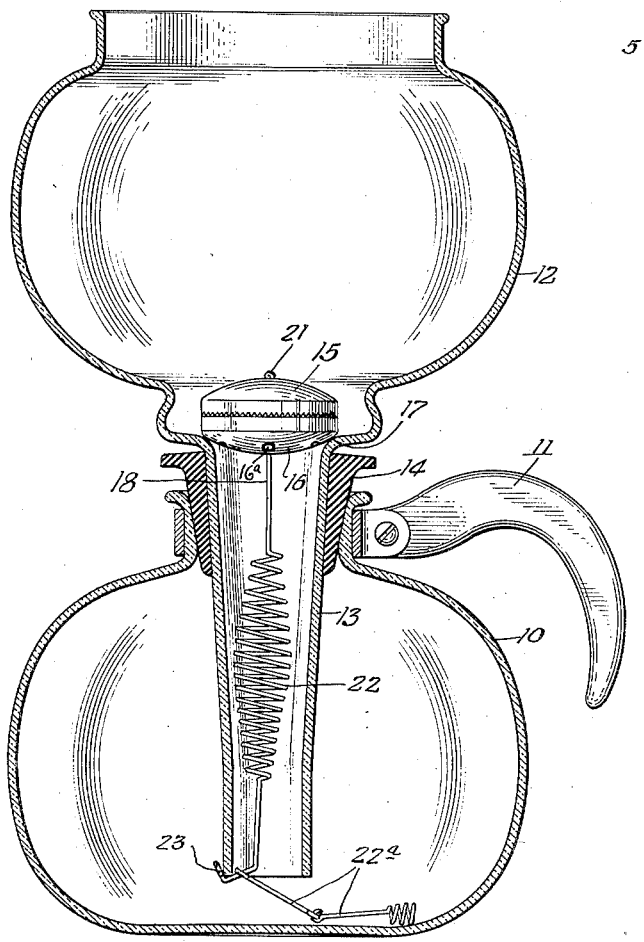
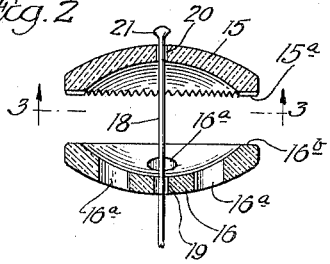
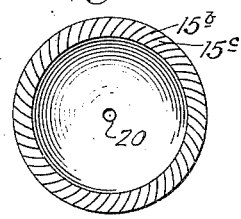
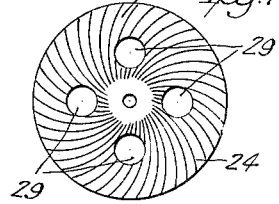
Inventor
Leroy A. Matson
By:
Sheridan, Davis + Cargill
Attys.

Patented Mar. 11, 1941

2,234,678

UNITED STATES PATENT OFFICE 2,234,678

FILTER

Leroy A. Matson, Chicago, Ill., assignor to Hill-Shaw Company, Chicago, Ill., a corporation of Illinois Application March 13, 1939, Serial No. 261,457

5 Claims. (Cl. 210—162)

This invention relates to improvements in filters, and more particularly to filters adapted for use in conjunction with coffee brewers of the vacuum type. In making coffee with brewers of the type mentioned, fabric filters have heretofore generally been employed although filters of other types have been contemplated and used to some extent. The present invention relates to non-fabric filters and an object of the invention is to provide an improved filter which does not require periodic renewal of any part, one which filters the brewed coffee satisfactorily, which can be cleansed readily without disassembling the parts, and which can be removed from and replaced in filtering position in the coffee brewer expeditiously.

Another object of the invention is to provide an improved filter which is relatively compact and is stable when in operative position. That is, it has little or no tendency to tilt or to be moved from side to side or become displaced from initial position during the brewing operation and hence is not likely to fracture the upper bowl or the funnel of the upper bowl.

A further object is to provide a filter of a construction enabling the same to be retained in filtering position regardless of the position of the bowl in which it is used, that is, a filter which will remain in position even when the bowl is inverted after use, for example. This feature of the invention makes it possible to flush out or cleanse the filter without removing it from the bowl if desired.

It is another object of the invention to provide a filter which can be formed of non-metallic material such as china, porcelain, or other moldable or plastic material, thereby providing a filter which is not only sanitary but relatively light in weight as compared with metallic or glass filters and which is inert to the constituents of the brewed coffee.

Other objects of the invention will be apparent from a consideration of the following specification and accompanying drawing wherein, Fig. 1 is a vertical sectional view through a conventional glass coffee brewer showing a filter embodying the present improvements in position therein.

Fig. 2 is a broken vertical sectional view through a filter of the type shown in Fig. 1, the two elements of the filter proper being shown in separated position.

Fig. 3 is a sectional plan view taken on line 3—3 of Fig. 2.

Fig. 4 is a vertical sectional view through a pair of cooperating filtering elements of the type shown in Figs. 1 and 2, but differing therefrom in that both contacting faces are striated or grooved, milled, or otherwise treated to provide filtering channels when the filtering elements are in cooperative relation.

Fig. 5 is a view taken on line 5—5 of Fig. 4.

Fig. 6 is a vertical sectional view through a modified filter, the parts being shown in spaced relation.

Fig. 7 is a view taken on line 7—7 of Fig. 6.

In Fig. 1 of the drawing a coffee brewer of conventional form is shown comprising a lower bowl 10 provided with a handle 11 and an upper bowl 12 having the usual funnel or stem 13 which, during the brewing operation, extends into the lower bowl 10 and carries a gasket or stopple 14 adjacent the upper end which forms a tight seal with the neck of the upper bowl. In the use of coffee brewers of this type, filters are employed which generally are located at or adjacent the upper end of the funnel 13 or, in other words, at the base of the upper bowl 12. The present improved filters are designed for use in that location.

The improved filter proper illustrated in Figs. 1 to 3 inclusive comprises a pair of members 15 and 16 which, when in operative position, are arranged in super position; that is, member 15 rests upon the member 16 as shown in Fig. 1. As illustrated in Figs. 2 and 3 member 16 has a convex lower peripheral surface the outer peripheral portion of which is arranged to seat on and form a seal with an annular section indicated at 17 in Fig. 1 adjacent the upper end of the funnel 13. The member 16 is shown as being convex at its upper surface. Since the filtered liquid must pass through the member 16, one or more passages or ports are provided for that purpose. In the embodiment illustrated four such ports 16a are shown which are located inwardly of the peripheral portion of the lower convex side, which contacts or rests on and forms a seal with the base of the upper bowl concentrically with reference to the funnel 13, as above mentioned.

The upper surface of the member 16 is provided at its periphery with a flat face or annular zone 16b. In this embodiment of the improvements the upper member 15 is generally similar in shape to member 16; that is, it has an upper convex surface and a lower concave surface the latter of which is provided with an annular face 15a corresponding generally to face 16a. The face 15a differs from face 16b however in that it is provided with formations which in cooperation with the lower element 16 provide filtering channels when the members are in the contacting relation shown in Fig. 1. These channels may be formed by suitably striating, milling, furrowing, or grooving the face 15a which provides spacing ribs 15b with intermediate filtering channels 15c, as illustrated in Fig. 3.

The formations referred to may extend radially of the member 15 if desired, although in the form illustrated they are slightly curved and are non-radial, whereby the length of the filtering channels from end to end is somewhat increased. The cross sectional area of the filtering channels 15c is such that the coffee particles and particularly the larger coffee particles employed in brewing the coffee will be prevented from passing through the channels from the upper bowl into the interior of the filter and thence through the ports 16a into the funnel 13 and thence into the lower bowl. While the formations which provide the spacing ribs or striations and thus the intermediate filtering channels are shown in Figs. 1 to 3 as being formed in the annular face of the upper member 15, they could be formed as well in the face 16b of the member 16. In fact, both such faces may be provided with such formations as shown in Fig. 4 wherein the illustrated invention is identical with that shown in Figs. 1 to 3 with the exception that the lower member 16 is provided with filter-channel forming formations 16c in the annular face 16b which contacts with the annular face 15a of the upper member 15 when the said members are in operative relation.

Where both filter members are provided with filter channel formations 15b and 16c they are arranged generally in intersecting relation when the filter members are assembled so as to avoid intermeshing relation of the formations and consequent closure of the respective filter channels.

Suitable means are provided for securing the members 15 and 16 together during the filtering operations, said means preferably being such that the members may be separated sufficiently for the purpose of cleansing the interiors thereof without actually disassembling the filtering structure. Such attaching means may comprise a wire stem 18 which extends through a central aperture 19 in member 16 and through a close fitting aperture 20 in member 15, the upper end of the stem 18 being headed as at 21 to prevent the member 15 from displacement therefrom. The member 18 may be attached thereto or be formed integrally with a spring 22 which at its lower end terminates in a hook 23. To the lower end may be attached two or more links 22a or the like of a length enabling the same to be grasped at the lower end of the funnel for convenience in distending spring 22 and drawing the hook 23 into engagement with the lower end of the funnel 13 whereby the tension of the spring draws the member 15 into mating contact with the member 16 and holds both members in the filtering position shown in Fig. 1. With the filter in the position shown in Fig. 1 water is placed in the lower bowl and ground coffee in the upper bowl. Heat is applied to the lower bowl and by the pressure developed in the lower bowl the water is caused to ascend the funnel 13, pass through the ports 16a and thence outwardly horizontally through the filtering channels 15c. When sufficient water has left the lower bowl to uncover the lower end of the funnel, it is the usual practice to turn off the heat or to remove the brewer from the source of heat, whereupon cooling of the vapor in the lower bowl produces a vacuum effect which draws the coffee brew down into the lower bowl. The coarser coffee grounds generally settle first and will accumulate around the filter in the lower end of the upper bowl. Hence the filtering passages 15c are at least small enough in cross sectional area to prevent the passage of the coarser grains of coffee through the filter. The brew in passing through the filter thus is filtered not only by reason of the relatively small filter channels through which the liquid must pass, but further by reason of the fact that the grounds first to settle and bank up around the outer ends of the filtering channel assist in the filtering operation and restrain the finer coffee particles, which are last to reach the bottom of the bowl, from passing through the filter into the lower bowl. By this arrangement a clear coffee brew in the lower bowl is provided.

The members 15 and 16 may be formed of metal if desired, in which instance the filtering channels 15c and 16c may be formed by a milling or like operation. However, the members 15 and 16 preferably are formed of a moldable material such as china or porcelain, in which instance the filtering channels may be formed by formations provided in the molds. Other suitable material may, of course, be employed.

The forms of the invention shown in Figs. 6 and 7 differ from the modifications above described in that neither of the filter members 15', 16' is provided with filter channel formations. In lieu of the formations formed on the face of one or both of the members as above described, a thin disc 24 may be interposed between the members 15', 16', which is substantially of the diameter of the filter members. The disc 24 is provided with filter channels 25 in the upper and lower surfaces thereof. The plane annular faces 26 and 27 of the members 15', 16' are arranged to contact respectively with the upper and lower periphery of the disc 24 whereby there are provided filtering channels which enable the liquid to flow inwardly between the members 15', 16' and downwardly through the funnel by means of ports 28 in the member 16' in the same manner as described above. The disc 24 is provided with vertical apertures 29 to permit the downward flow of filtered liquid which passes between the disc 24 and the upper member 15'. The filtering channels 25 of the disc 24 are shown likewise as being non-radial and may be formed in the metal disc by any suitable means on one or both sides thereof, as will be understood.

The disc 24 is illustrated as being of substantial thickness, but this thickness is somewhat exaggerated since in actual practice it need be of only relatively thin material such as stainless steel, for example.

It will be observed that the two filter members are confined on the stem 18 and that when the hook 23 has been released from engagement with the lower end of the funnel 13 the entire filter can be removed readily from the upper bowl. The members 15 and 16 can then be separated by moving the lower member along the stem 18 and any coffee ground particles that may be lodged in the filtering channels can readily be flushed out. If desired, the filter can be cleansed effectually without actually removing it from the upper bowl. For example, after a brewing operation the loose grounds in the upper bowl can be rinsed out by holding the same under a faucet if desired, and the bowl then inverted to permit water to run down the funnel through the ports in the lower member 16 and thence out through the filtering channels to remove any lodged particles therein. It is, thus, not necessary in all instances to remove the filter device from the bowl for the purpose of cleansing.

The cooperating filter members 15 and 16, as will be noted, seat in the lower portion of the upper bowl and thus do not render the same unstable nor is the filter readily dislodged from the proper filtering position illustrated in the drawing, either accidentally when placing the ground coffee in the upper bowl or by the action of the hot water as it flows upwardly through the stem during the filtering operation.

Other advantages of the improvements will be apparent to those skilled in the art.

While I have shown and described said embodiments of my improvements for the purpose of illustration, I do not wish to be restricted specifically thereto since it will be apparent that various changes may be made in the particular embodiments shown without departing from the spirit of the invention.

I claim:

1. A filter comprising a pair of superposed members provided with contacting faces formed to provide a number of filtering channels intermediate said faces and extending inwardly from the periphery of the members, one or more fluid ports extending through the lower of said members from top to bottom thereof and communicating with said filtering passages, and means engaging the upper member and passing slidably through the lower member for pressing the latter against a wall of a vessel and for securing said members in said contacting relation.

2. A filter for use in an upper bowl of a glass coffee brewer provided with a funnel comprising a pair of superposed filter members having mutually contactable faces formed to provide a plurality of filtering passages therebetween, the lower of said members having one or more outlets for discharging fluid from said passages into said funnel and resilient means arranged for engagement with the lower end of the funnel for retaining said filter members in contacting relation over the upper end of the funnel with said outlets in communication with the funnel and comprising a stem extending loosely through the lower of said members and engaging the upper of said members whereby the members can be separated axially of the stem when said resilient member is disengaged from said funnel.

3. A filter for use in a vessel comprising a pair of superposed members provided with annular filtering areas at contiguous margins thereof, the said area of the upper member being adapted to overlie the annular area of the lower member, one of said areas being provided with filtering channels extending from the outer to the inner periphery thereof, one or more fluid outlet ports in the lower member disposed inwardly of the annular area of said member, said members being formed to provide an internal chamber providing communication between said filtering passages and said outlet ports, and axially disposed means secured to the upper of said members and extending through the lower member slidably for releasably securing said members to a vessel in cooperative filtering relation therein, and affording relative sliding movement of said members along said means when the latter is released from engagement with the vessel.

4. A filter for use in the upper bowl of a vacuum coffee brewer comprising a pair of superposed filtering elements having annular contacting surfaces one of which is provided with filtering channels open at the outer ends for egress of fluid from the upper bowl, said lower element having its lower surface shaped to seat over the upper end of the funnel of the upper bowl in contact with the portion of the bowl wall surrounding the upper end of the funnel to prevent the flow of fluid beneath said element into said funnel, said lower member being provided with one or more fluid ports therethrough adapted to register with the funnel and communicating on the interior of the filter with said channels whereby fluid passing through said channels can flow into said port or ports and into said funnel, said upper filtering element constituting a closure of the lower element to preclude the flow of fluid from the bowl into the ports of the lower element except through said filtering channels, and a member passing slidably through said lower element and engaging said upper element and provided with latching means for attachment to said funnel for holding said upper element in contacting relation with said lower element and retaining the latter element in said position over said funnel in contact with said wall of the bowl during the filtering operation.

5. A filter for a coffee brewer consisting of two coacting superposed filtering elements having coacting surfaces defining filtering channels when said surfaces are in contact and a stem upon which said members are mounted for relative sliding movement and constituting means for drawing said co-acting surfaces into such contact and for drawing the lower of said elements into firm contact with the wall of the coffee brewer and being provided with means at the lower end for engaging a portion of the brewer for retaining said filtering elements in said filtering relation.

LEROY A. MATSON.